United States Patent
Gui et al.

(10) Patent No.: US 11,181,624 B2
(45) Date of Patent: Nov. 23, 2021

(54) METHOD AND APPARATUS FOR CALIBRATION BETWEEN LASER RADAR AND CAMERA, DEVICE AND STORAGE MEDIUM

(71) Applicant: BAIDU ONLINE NETWORK TECHNOLOGY (BEIJING) CO., LTD., Haidian District Beijing (CN)

(72) Inventors: Popo Gui, Beijing (CN); Yuanfan Xie, Beijing (CN); Liang Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 585 days.

(21) Appl. No.: 16/011,152

(22) Filed: Jun. 18, 2018

(65) Prior Publication Data
US 2018/0372852 A1  Dec. 27, 2018

(30) Foreign Application Priority Data

Jun. 22, 2017 (CN) .......................... 201710480669.9

(51) Int. Cl.
*G01S 7/497* (2006.01)
*G06T 7/33* (2017.01)
(Continued)

(52) U.S. Cl.
CPC ............ *G01S 7/497* (2013.01); *G01S 7/4972* (2013.01); *G01S 17/86* (2020.01); *G01S 17/89* (2013.01);
(Continued)

(58) Field of Classification Search
CPC .................................. G01S 7/497; G06T 7/80
See application file for complete search history.

(56) References Cited

U.S. PATENT DOCUMENTS 6,333,749 B1    12/2001 Reinhardt et al.
6,785,427 B1 *   8/2004 Zhou .................... G06T 3/4038
                                                    382/154
(Continued)

FOREIGN PATENT DOCUMENTS

CN    101882313 A    11/2010
CN    102693319 A     9/2012
(Continued)

OTHER PUBLICATIONS

Calibration of an Outdoor Distributed Camera Network with a 3D Point Cloud by Agustín Ortega, Manuel Silva, Ernesto H. Teniente, Ricardo Ferreira, Alexandre Bernardino, José Gaspar, and Juan Andrade-Cetto; Sensors 2014, pp. 13708-13729; <www.mdpi.com/journal/sensors>.

(Continued)

*Primary Examiner* — Lisa E Peters
(74) *Attorney, Agent, or Firm* — Brooks Kushman P.C.

(57) ABSTRACT

The present disclosure provides a method and apparatus for calibration between a laser radar and a camera, a device and a storage medium, wherein the method comprises: respectively obtaining N stations of calibration data at N locations, each station of calibration data respectively comprising: image data collected by a camera and point cloud data collected by a laser radar, N being a positive integer; building an image pyramid for each station of image; performing a search for each layer of pyramid in a top-to-bottom order according to a preset initial calibration parameter and point cloud data, and determining an optimal calibration parameter according to search results. The solution of the present disclosure may be applied to achieve real-time online calibration.

28 Claims, 5 Drawing Sheets

(51) Int. Cl.
*G01S 17/86* (2020.01)
*G06T 7/80* (2017.01)
*G01S 17/89* (2020.01)

(52) U.S. Cl.
CPC .............. *G06T 7/33* (2017.01); *G06T 7/80* (2017.01); *G06T 2207/10016* (2013.01); *G06T 2207/10028* (2013.01)

(56) References Cited

U.S. PATENT DOCUMENTS

| | | | | |
|---|---|---|---|---|
| 2006/0067573 | A1* | 3/2006 | Parr | G06K 9/00 382/154 |
| 2007/0253618 | A1* | 11/2007 | Kim | G06T 7/80 382/154 |
| 2018/0276885 | A1* | 9/2018 | Singh | G06T 17/20 |
| 2018/0316912 | A1* | 11/2018 | Wakai | H04N 13/239 |

FOREIGN PATENT DOCUMENTS

| | | |
|---|---|---|
| CN | 103837869 A | 6/2014 |
| CN | 104142157 A | 11/2014 |
| CN | 104899857 A | 9/2015 |
| CN | 106485690 A | 3/2017 |
| CN | 106871932 A | 6/2017 |

OTHER PUBLICATIONS

Chinese Office Action dated Mar. 5, 2020, for related Chinese Appln. No. 201710480669.9; 5 Pages.

Chinese Search Report dated Feb. 2, 2020 for related Chinese Appln. No. 2017104806699; 2 Pages.

Search Report of Chinese application No. 2017104806699 dated Aug. 11, 2021, 2 pages.

* cited by examiner

METHOD AND APPARATUS FOR CALIBRATION BETWEEN LASER RADAR AND CAMERA, DEVICE AND STORAGE MEDIUM The present application claims the priority of Chinese Patent Application No. 2017104806699, filed on Jun. 22, 2017, with the title of "Method and apparatus for calibration between laser radar and camera, device and storage medium". The disclosure of the above applications is incorporated herein by reference in its entirety.

FIELD OF THE DISCLOSURE

The present disclosure relates to computer application technologies, and particularly to a method and apparatus for calibration between a laser radar and a camera, a device and a storage medium.

BACKGROUND OF THE DISCLOSURE

Calibration is a basic issue in the field of computer vision and robots. For example, in a movable platform such as a driverless vehicle which is simultaneously mounted with two types of sensors, namely, a laser radar and a camera, it is necessary to perform calibration between the laser radar and the camera.

In the prior art, it is usual to employ a calibration manner depending on a certain target, for example, use a checkerboard, a QR code or a specific scenario.

However, this calibration manner is not flexible enough, mainly performs calibration offline, cannot perform online real-time calibration, and even needs to maintain a fixed site to ensure calibration quality.

SUMMARY OF THE DISCLOSURE

In view of the above, the present disclosure provides a method and apparatus for calibration between a laser radar and a camera, a device and a storage medium, which can achieve real-time online calibration.

Specific technical solutions are as follows:

A method for calibration between a laser radar and a camera, comprising:

respectively obtaining N stations of calibration data at N locations, each station of calibration data respectively comprising: image data collected by a camera and point cloud data collected by a laser radar, N being a positive integer;

building an image pyramid for each station of image;

performing a search for each layer of pyramid in a top-to-bottom order according to a preset initial calibration parameter and point cloud data, and determining an optimal calibration parameter according to search results.

According to a preferred embodiment of the present disclosure, the calibration parameters comprise Q parameters, Q being a positive integer larger than one;

the performing a search for each layer of pyramid in a top-to-bottom order according to a preset initial calibration parameter and point cloud data, and determining an optimal calibration parameter according to search results comprises:

performing a search operation in the following manner with respect to the $i^{th}$ layer of pyramid, wherein i is a positive integer, and $1 \leq i \leq M$, and M is a positive integer larger than one and represents the number of layers of image pyramid:

respectively performing discretization processing for values of parameters in initial calibration parameters, and generating expanded calibration parameters according to discretization processing results, the expanded calibration parameters including the initial calibration parameters;

for each expanded calibration parameter, determining a similarity corresponding to the expanded calibration parameter respectively according to an image and point cloud data corresponding to the $i^{th}$ layer of pyramid in each image pyramid;

selecting a corresponding expanded calibration parameter with a maximum similarity value;

if the selected expanded calibration parameter is different from an initial calibration parameter obtained the latest, considering the selected expanded calibration parameter as an updated initial calibration parameter, and repeatedly performing the search operation according to the updated initial calibration parameter;

if the selected expanded calibration parameter is the same as the initial calibration parameter obtained the latest, and there exists next layer of pyramid, considering the selected expanded calibration parameter as the initial calibration parameter, and performing the search operation for the next layer of pyramid;

if the selected expanded calibration parameter is the same as an initial calibration parameter obtained the latest, and there does not exist next layer of pyramid, considering the selected expanded calibration parameter as the optimal calibration parameter.

According to a preferred embodiment of the present disclosure, for each expanded calibration parameter, determining the similarity corresponding to the expanded calibration parameter respectively according to the $i^{th}$ layer of pyramid in each image pyramid comprises:

for the $i^{th}$ layer of pyramid in the image pyramid built for the $j^{th}$ station of image, j being a positive integer, and $1 \leq j \leq N$, respectively calculating a similarity between the image corresponding to the $i^{th}$ layer of pyramid and the $j^{th}$ station of point cloud data;

solving a mean value from the calculated N similarities, and considering the calculated mean value as the similarity corresponding to the expanded calibration parameter.

According to a preferred embodiment of the present disclosure, before building an image pyramid for each station of image, the method further comprises:

determining whether to perform re-calibration according to the calibration data, and if yes, building the image pyramid for each station of image.

According to a preferred embodiment of the present disclosure, the determining whether to perform re-calibration according to the calibration data comprises:

performing discretization processing for values of parameters in currently-used calibration parameters, and generating expanded calibration parameters according to discretization processing results, the expanded calibration parameters including the currently-used calibration parameters;

with respect to each expanded calibration parameter, respectively calculating a similarity between an image and point cloud data in each station of calibration data, solving a mean value from the calculated N similarities, and then considering the obtained mean value as a similarity corresponding to the expanded calibration parameter;

if a proportion of expanded calibration parameters meeting a predetermined requirement among all expanded calibration parameters is smaller than a predetermined threshold, determining that re-calibration needs to be performed, the predetermined requirement being that the corresponding similarity is smaller than the similarity corresponding to the currently-used calibration parameter.

According to a preferred embodiment of the present disclosure, the performing discretization processing for values of parameters, and generating expanded calibration parameters according to discretization processing results comprises:

for each parameter, considering a value of the parameter as a default value, and performing discretization processing for the parameter in a predetermined interval to obtain P discrete values, P being an even number;

generating the expanded calibration parameters, each expanded calibration parameter including the Q parameters, a value of each parameter being a default value or a discrete value, and any two expanded calibration parameters being not completely the same.

According to a preferred embodiment of the present disclosure, the manner of calculating the similarity between the image and point cloud data comprises:

obtaining an edge value of each pixel point in the image;

obtaining an edge value of each point in the point cloud data;

as for each point in the point cloud data, converting a coordinate of the point into an image coordinate respectively according to an internal parameter of the camera and the calibration parameters, and establishing a correspondence relation between the edge value of the pixel point at the image coordinate and the edge value of the point if the image coordinate is located in a range of coordinate of the image;

multiplying two edge values which are in each correspondence relation, and summating multiplication results;

calculating a ratio of a sum obtained from the summation to the number of established correspondence relations, and considering a calculation result as a desired similarity.

According to a preferred embodiment of the present disclosure, the obtaining an edge value of each pixel point in the image comprises:

performing edge extraction for the image and obtaining an edge image;

considering the edge image as a to-be-processed image, and performing edge blurring processing for the to-be-processed image, comprising:

performing Gaussian blurring for the to-be-processed image, and superposing the blurred image and the to-be-processed image to obtain a blurred edge-preserved image;

considering the blurred edge-preserved image as the to-be-processed image, and repeatedly executing the edge blurring processing until times of repetition reach predetermined times;

when the times of repetition reach the predetermined times, considering the blurred edge-preserved image obtained latest as an edge blurred image, and considering a value of each pixel point in the edge blurred image as an edge value of each pixel point.

According to a preferred embodiment of the present disclosure, the obtaining an edge value of each point in the point cloud data comprises:

respectively performing the following processing for each point in the point cloud data:

considering the point as a to-be-processed point;

obtaining four neighborhood points of the to-be-processed point;

if the four neighborhood points are incomplete, setting the edge value of the to-be-processed point as 1;

if the four neighborhood points are complete, respectively calculating a distance difference between each neighborhood point in the four neighborhood points and the to-be-processed point, and selecting a distance difference with a maximum value; if the selected distance difference is larger than 1, setting the edge value of the to-be-processed point as 1; if the selected distance difference is smaller than 0, setting the edge value of the to-be-processed point as 0, otherwise considering the selected distance difference as the edge value of the to-be-processed point;

or if the four neighborhood points are complete, respectively calculating a gray level difference between each neighborhood point in the four neighborhood points and the to-be-processed point, selecting a gray level difference with a maximum absolute value, calculating a product of an absolute value of the selected gray level difference and 0.1, setting the edge value of the to-be-processed point as 1 if the product is larger than 1, and otherwise considering the product as the edge value of the to-be-processed point.

An apparatus for calibration between a laser radar and a camera, comprising: an obtaining unit and a calibration unit;

the obtaining unit is configured to respectively obtain N stations of calibration data at N locations, each station of calibration data respectively comprising: image data collected by a camera and point cloud data collected by a laser radar, N being a positive integer;

the calibration unit is configured to build an image pyramid for each station of image, perform a search for each layer of pyramid in a top-to-bottom order according to a preset initial calibration parameter and point cloud data, and determine an optimal calibration parameter according to search results.

According to a preferred embodiment of the present disclosure, the calibration parameters comprise Q parameters, Q being a positive integer larger than one;

the calibration unit performs a search operation in the following manner with respect to the $i^{th}$ layer of pyramid, wherein i is a positive integer, and $1 \leq i \leq M$, and M is a positive integer larger than one and represents the number of layers of image pyramid:

respectively performing discretization processing for values of parameters in initial calibration parameters, and generating expanded calibration parameters according to discretization processing results, the expanded calibration parameters including the initial calibration parameters;

for each expanded calibration parameter, determining a similarity corresponding to the expanded calibration parameter respectively according to an image and point cloud data corresponding to the $i^{th}$ layer of pyramid in each image pyramid;

selecting a corresponding expanded calibration parameter with a maximum similarity value;

if the selected expanded calibration parameter is different from an initial calibration parameter obtained the latest, considering the selected expanded calibration parameter as an updated initial calibration parameter, and repeatedly performing the search operation according to the updated initial calibration parameter;

if the selected expanded calibration parameter is the same as the initial calibration parameter obtained the latest, and there exists next layer of pyramid, considering the selected expanded calibration parameter as the initial calibration parameter, and performing the search operation for the next layer of pyramid;

if the selected expanded calibration parameter is the same as an initial calibration parameter obtained the latest, and there does not exist next layer of pyramid, considering the selected expanded calibration parameter as the optimal calibration parameter.

According to a preferred embodiment of the present disclosure, the calibration unit, for each expanded calibration parameter, determining the similarity corresponding to the expanded calibration parameter in the following manner comprises:

for the $i^{th}$ layer of pyramid in the image pyramid built for the $j^{th}$ station of image, j being a positive integer, and $1 \leq j \leq N$, respectively calculating a similarity between the image corresponding to the $i^{th}$ layer of pyramid and the $j^{th}$ station of point cloud data;

solving a mean value from the calculated N similarities, and considering the calculated mean value as the similarity corresponding to the expanded calibration parameter.

According to a preferred embodiment of the present disclosure, the apparatus further comprises a checking unit;

the checking unit is configured to determine whether to perform re-calibration according to the calibration data, and if yes, send the calibration data to the calibration unit and inform the calibration unit of performing its own function.

According to a preferred embodiment of the present disclosure, the checking unit respectively performs discretization processing for values of parameters in the currently-used calibration parameters, and generates expanded calibration parameters according to discretization processing results, the expanded calibration parameters including the currently-used calibration parameters;

the checking unit, with respect to each expanded calibration parameter, calculates a similarity between an image and point cloud data in each station of calibration data, solves a mean value from the calculated N similarities, and then considers the obtained mean value as a similarity corresponding to the expanded calibration parameter;

if a proportion of expanded calibration parameters meeting a predetermined requirement among all expanded calibration parameters is smaller than a predetermined threshold, the checking unit determines that re-calibration needs to be performed, the predetermined requirement being that the corresponding similarity is smaller than the similarity corresponding to the currently-used calibration parameter.

According to a preferred embodiment of the present disclosure, the calibration unit and the checking unit, for each parameter, consider a value of the parameter as a default value, and perform discretization processing for the parameter in a predetermined interval to obtain P discrete values, P being an even number, and then generate the expanded calibration parameters, each expanded calibration parameter including the Q parameters, a value of each parameter being a default value or a discrete value, and any two expanded calibration parameters being not completely the same.

According to a preferred embodiment of the present disclosure, the manner of the calibration unit and the checking unit calculating the similarity between the image and point cloud data comprises:

obtaining an edge value of each pixel point in the image;
obtaining an edge value of each point in the point cloud data;

as for each point in the point cloud data, converting a coordinate of the point into an image coordinate respectively according to an internal parameter of the camera and the calibration parameters, and establishing a correspondence relation between the edge value of the pixel point at the image coordinate and the edge value of the point if the image coordinate is located in a range of coordinate of the image;

multiplying two edge values which are in each correspondence relation, and summating multiplication results;

calculating a ratio of a sum obtained from the summation to the number of established correspondence relations, and considering a calculation result as a desired similarity.

According to a preferred embodiment of the present disclosure, the calibration unit and the checking unit perform edge extraction for the image and obtain an edge image;

consider the edge image as a to-be-processed image, and perform edge blurring processing for the to-be-processed image, comprising:

performing Gaussian blurring for the to-be-processed image, and superposing the blurred image and the to-be-processed image to obtain a blurred edge-preserved image;

considering the blurred edge-preserved image as the to-be-processed image, and repeatedly executing the edge blurring processing until times of repetition reach predetermined times;

when the times of repetition reach the predetermined times, considering the blurred edge-preserved image obtained latest as an edge blurred image, and considering a value of each pixel point in the edge blurred image as an edge value of each pixel point.

According to a preferred embodiment of the present disclosure, the calibration unit and the checking unit respectively perform the following processing for each point in the point cloud data:

considering the point as a to-be-processed point;
obtaining four neighborhood points of the to-be-processed point;
if the four neighborhood points are incomplete, setting the edge value of the to-be-processed point as 1;

if the four neighborhood points are complete, respectively calculating a distance difference between each neighborhood point in the four neighborhood points and the to-be-processed point, and selecting a distance difference with a maximum value; if the selected distance difference is larger than 1, setting the edge value of the to-be-processed point as 1; if the selected distance difference is smaller than 0, setting the edge value of the to-be-processed point as 0, otherwise considering the selected distance difference as the edge value of the to-be-processed point;

or if the four neighborhood points are complete, respectively calculating a gray level difference between each neighborhood point in the four neighborhood points and the to-be-processed point, selecting a gray level difference with a maximum absolute value, calculating a product of an absolute value of the selected gray level difference and 0.1, setting the edge value of the to-be-processed point as 1 if the product is larger than 1, and otherwise considering the product as the edge value of the to-be-processed point.

A computer device, comprising a memory, a processor and a computer program which is stored on the memory and runs on the processor, the processor, upon executing the program, implementing the above-mentioned method.

A computer-readable storage medium on which a computer program is stored, the program, when executed by a processor, implementing the aforesaid method.

As can be seen from the above introduction, according to solutions of the present disclosure, when it is necessary to perform calibration between the laser radar and the camera, N stations of calibration data may be obtained respectively at N locations, each station of calibration data respectively comprising: image data collected by the camera and point cloud data collected by the laser radar; then it is feasible to build an image pyramid for each station of image, perform a search for each layer of pyramid in a top-to-bottom order according to a preset initial calibration parameter and point cloud data, and thereby determine an optimal calibration parameter according to search results. As compared with the prior art, the solutions of the present disclosure, without depending on a target, enable real-time online calibration without maintaining a fixed site, and therefore reduce the implementation costs.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
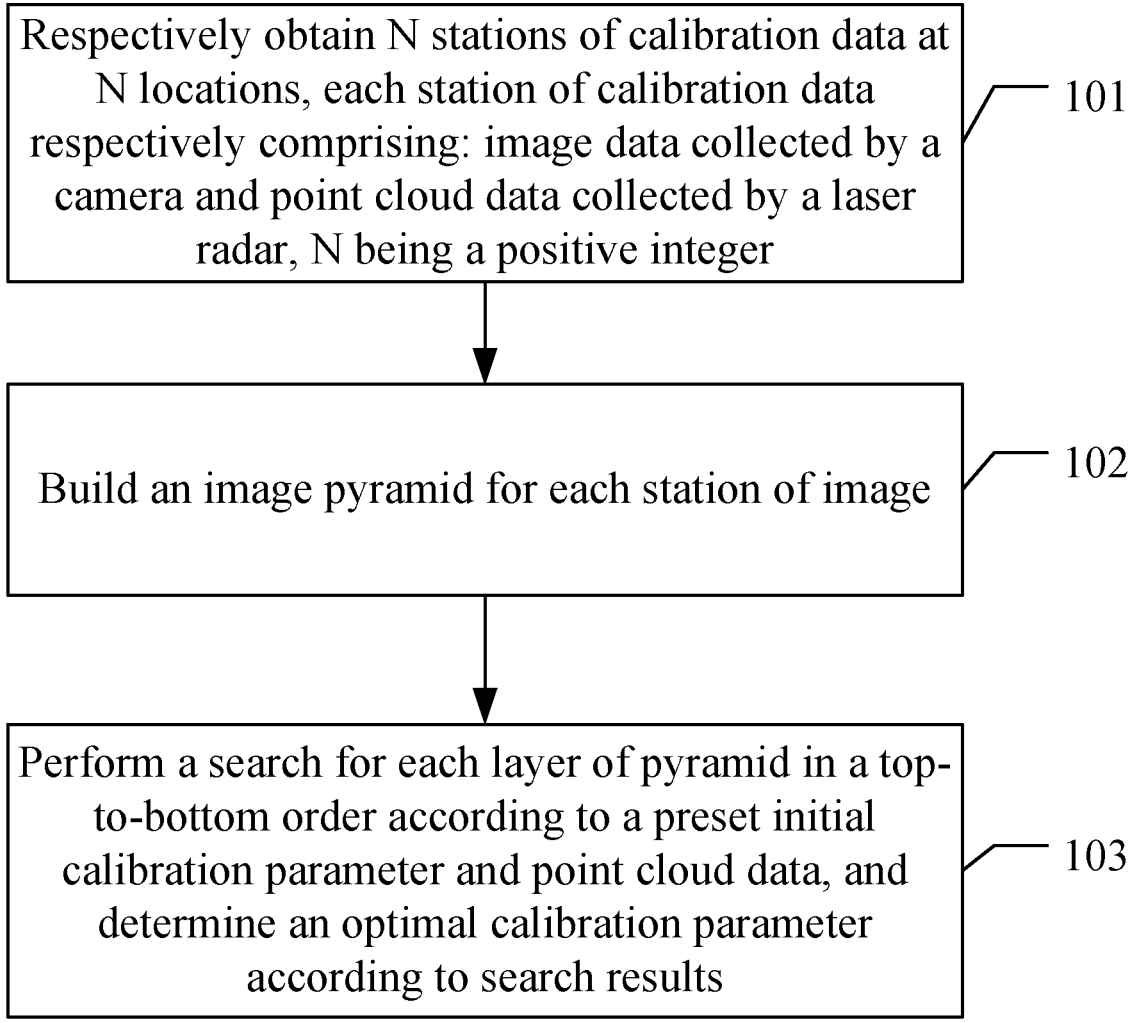
FIG. 1 is a flow chart of an embodiment of a method for calibration between a laser radar and a camera according to the present disclosure.

FIG. 1 is a flow chart of an embodiment of a method for calibration between a laser radar and a camera according to the present disclosure. As shown in FIG. 1, the embodiment comprises the following specific implementation mode.

101 relates to respectively obtaining N stations of calibration data at N locations, each station of calibration data respectively comprising: image data collected by a camera and point cloud data collected by a laser radar, N being a positive integer.

102 relates to building an image pyramid for each station of images;

103 relates to performing a search for each layer of pyramid in a top-to-bottom order according to a preset initial calibration parameter and point cloud data, and determining an optimal calibration parameter according to search results.

Before a movable platform such as a driverless vehicle mounted with a laser radar and a camera having an overlapping area begins to operate or when it is necessary to verify whether the calibration parameter is normal, it is feasible to, with respect to different locations, collect one station or more stations of surrounding scenario data as calibration data, namely, collect N stations of calibration data, a specific value of N depending on actual needs, and then determine whether to re-calibrate according to the obtained calibration data, namely, perform calibration verification; if re-calibration is needed, 102 and 103 are performed, namely, search and calibration is performed. Or it is also feasible not to perform calibration verification, but directly perform search and calibration after the calibration data is obtained. Preferably, the manner of performing calibration verification may be employed.

Specific implementations of each of the above-mentioned portions are described respectively in detail.

1) Calibration Verification

To perform calibration verification, it is feasible to collect one station or more stations of calibration data at different locations, each station corresponding to one station of calibration data, each station of calibration data comprising: one sheet of image data collected by the camera and one frame of point cloud data collected by the laser radar.

Then, it is feasible to respectively perform discretization processing for values of parameters in the currently-used calibration parameters, and generate expanded calibration parameters according to discretization processing results, the expanded calibration parameters including the currently-used calibration parameters.

The calibration parameters comprise Q parameters, Q being a positive integer larger than one and usually taking a value 6, i.e., the calibration parameters may comprise 6 parameters, including three rotation parameters and three translation parameters.

It is possible to, for each parameter in the calibration parameters, consider a value of the parameter as a default value, and perform discretization processing for the parameter in a predetermined interval to obtain P discrete values, P being an even number, values of the predetermined interval and P depending on actual needs, for example, it is feasible to take 4 discrete values around the parameter. As such, a total of five values are obtained for the parameter, including one default value and 4 discrete values.

Then, the expanded calibration parameters may be generated, each expanded calibration parameter including the above-mentioned Q parameters, a value of each parameter is a default value or a discrete value, and any two expanded calibration parameters are not completely the same.

It is assumed the 6 parameters in the calibration parameters are respectively called parameter 1-parameter 6, each expanded calibration parameter includes the 6 parameter, namely, parameter 1-parameter 6. The only thing is that in different expanded calibration parameters, the values of the parameters might be different. Take parameter 1 in any expanded calibration parameter as an example, the value of parameter 1 may be a default value or a discrete value. If values of parameter 1-parameter 6 all are default values, the expanded calibration parameter is the currently-used calibration parameter.

Then, it is feasible to, with respect to each obtained expanded calibration parameter, calculate a similarity between an image and point cloud data in each station of calibration data, solve a mean value from the calculated N similarities, and then consider the obtained mean value as a similarity corresponding to the expanded calibration parameter.

As stated above, a total of N stations of calibration data are obtained. It is feasible to, with respect to any expanded calibration parameter, calculate a similarity between the image and the point cloud data in each station of calibration data under the expanded calibration parameter. As such, it is possible to, with respect to the expanded calibration parameter, obtain a total of N similarities whose mean value may be considered as the similarity corresponding to the expanded calibration parameter.

Assume the value of N is 3, a total of 3 stations of calibration data are obtained. Then, it is feasible to respectively calculate a similarity between the image and the point cloud data in the first station of calibration data under the expanded calibration parameter, a similarity between the image and the point cloud data in the second station of calibration data under the expanded calibration parameter, and a similarity between the image and the point cloud data in the third station of calibration data under the expanded calibration parameter, and then calculate a mean value of the three similarities as the similarity corresponding to the expanded calibration parameter.

It is feasible to, in the above manner, obtain the similarity corresponding to each expanded calibration parameter, and thereby perform analysis processing, and determine that re-calibration needs to be performed if a processing result shows that a proportion of expanded calibration parameters meeting a predetermined requirement among all expanded calibration parameters is smaller than a predetermined threshold, the predetermined requirement being that the corresponding similarity is smaller than the similarity corresponding to the currently-used calibration parameter.

For example, the expanded calibration parameters may be ranked in a descending order of the corresponding similarities. If the currently-used calibration parameter ranks before 98% expanded calibration parameters, it is believed that re-calibration needn't be performed, otherwise re-calibration needs to be performed.

As stated above, in the above implementation procedure, the similarity between the image and the point cloud data needs to be calculated. A specific calculation manner is described below.

Figure 2:
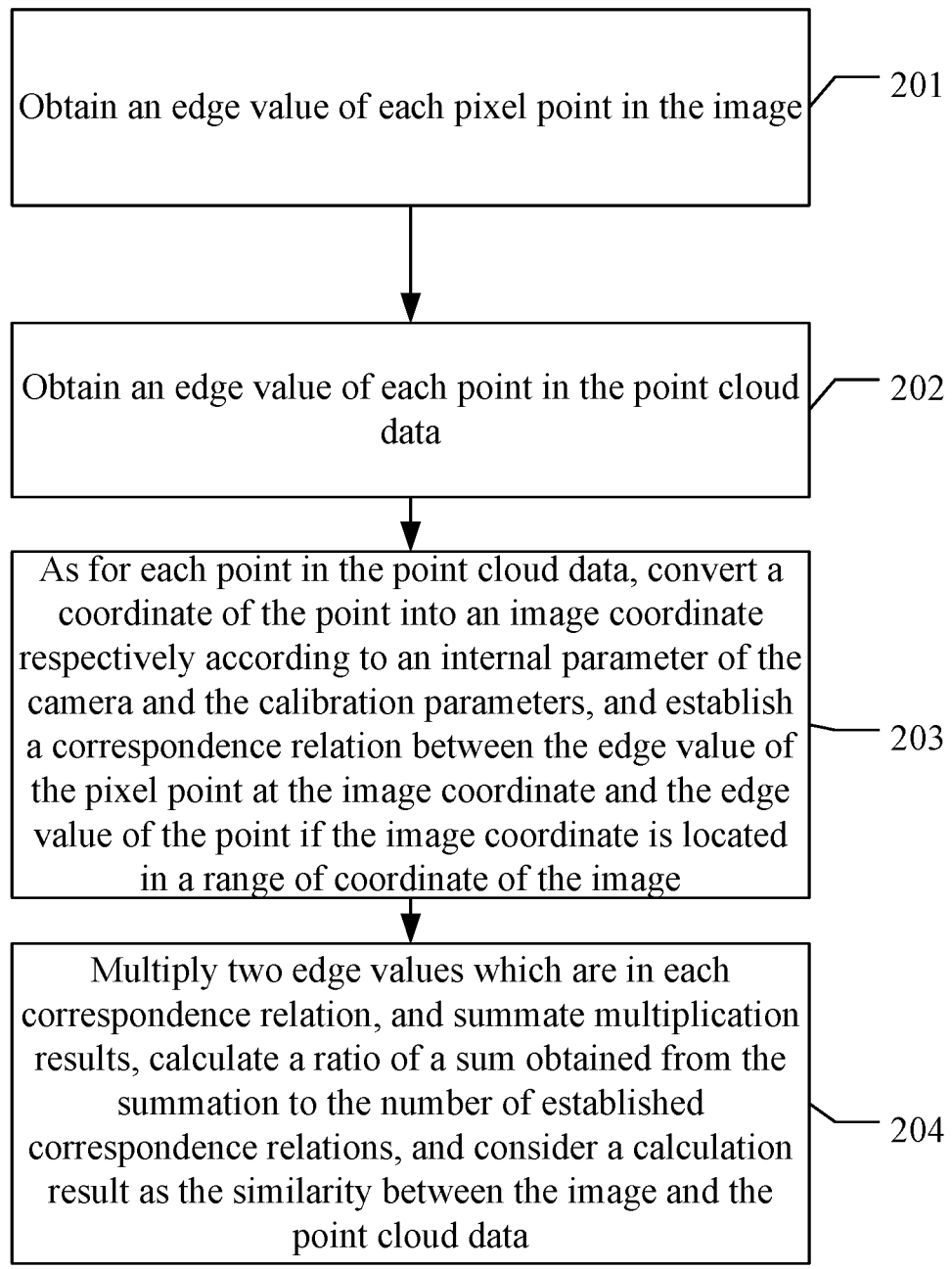
FIG. 2 is a flow chart of an embodiment of a method of calculating a similarity between an image and point cloud data according to the present disclosure.

FIG. 2 is a flow chart of an embodiment of a method of calculating the similarity between an image and point cloud data according to the present disclosure. As shown in FIG. 2, the embodiment comprises the following specific implementation mode.

In 201 is obtained an edge value of each pixel point in the image.

It is feasible to perform image edge processing to obtain image edge value information adapted for calibration.

Specifically, it is possible to first perform edge extraction for the image, namely, use an edge extraction algorithm such as a Canny edge extraction operator to extract edge information of the image to thereby obtain an edge image.

Then, it is feasible to consider the edge image as a to-be-processed image, and perform edge blurring processing for the to-be-processed image, which comprises:

A. performing Gaussian blurring for the to-be-processed image to blur the edge;

B. superposing the blurred image and the to-be-processed image according to a predetermined weight (e.g., 7:3) to obtain a blurred edge-preserved image;

C. considering the blurred edge-preserved image as the to-be-processed image, repeatedly executing A-B until times of repetition reach predetermined times;

For example, execution may be repeated 3-5 times;

D. when the times of repetition reach the predetermined times, considering the blurred edge-preserved image obtained latest as an edge blurred image, and considering a value of each pixel point in the edge blurred image as an edge value of each pixel point.

In 202 is obtained an edge value of each point in the point cloud data.

All points in the point cloud data may be traversed. Processing is performed for each point in the following manner:

considering the point as a to-be-processed point, and obtaining four neighborhood points of the to-be-processed point.

Wherein if the point cloud is ordered point cloud, the four neighborhood points of the to-be-processed point may be directly obtained according to a serial number; if the point cloud is unordered, it is feasible to search for neighboring points according to nearest neighborhood of a scanning angle thereof, and seek for the most likely four neighborhood points according to resolution information of the point cloud.

Then, the edge value of the to-be-processed point may be further determined.

For example, if the four neighborhood points of the to-be-processed point are incomplete, if there exist infinite far points, the to-be-processed point is the edge point, and the edge value of the to-be-processed point is set as 1.

If the four neighborhood points of the to-be-processed point are complete, it is feasible to respectively calculate a distance difference between each neighborhood point in the four neighborhood points and the to-be-processed point (namely, a difference between a distance value of each neighborhood point and a distance value of the to-be-processed point), and select the distance difference with a maximum value; if the selected distance difference is larger than 1, the edge value of the to-be-processed point is set as 1; if the selected distance difference is smaller than 0, the edge value of the to-be-processed point is set as 0, otherwise the selected distance difference serves as the edge value of the to-be-processed point.

In this manner, if the laser radar's resolution is not uniform in a horizontal direction and a vertical direction, it is necessary to perform uniform scale processing, namely, regarding two neighborhood points in the vertical direction among the four neighborhood points, multiply the corresponding distance difference obtained from calculation respectively with a ratio of resolution in the horizontal direction to resolution in the vertical direction, then consider an obtained product as a desired distance difference for selection of a maximum value.

Alternatively, if the four neighborhood points of the to-be-processed point are complete, it is feasible to respectively calculate a gray level difference between each neighborhood point in the four neighborhood points and the to-be-processed point, select a gray level difference with a maximum absolute value, calculate a product of an absolute value of the selected gray level difference and 0.1, set the edge value of the to-be-processed point as 1 if the product is larger than 1, and otherwise consider the product as the edge value of the to-be-processed point.

In 203, as for each point in the point cloud data, a coordinate of the point is converted into an image coordinate respectively according to an internal parameter of the camera and the calibration parameters. If the obtained image coordinate is located in a range of coordinate of the image, a correspondence relation between the edge value of the pixel point at the image coordinate and the edge value of the point is established.

On the premise of a known internal parameter K of the camera, given a group of transformation parameters (calibration parameters) R,t of the radar relative to the camera, if the coordinate of each point in the point cloud is X, the coordinate may be converted into an image coordinate x according to the equation x=K(RX+t); if the x is in the range of coordinate of the image, the edge value $E(I_x)$ of the pixel point at x in the image and the edge value $E(C_x)$ of the point at X in the point cloud form a correspondence relation.

In 204, multiply two edge values which are in each correspondence relation, summate multiplication results, calculate a ratio of a sum obtained from the summation to the number of established correspondence relations, and consider a calculation result as the similarity between the image and the point cloud data.

Multiple groups of the above-mentioned correspondence relations may be established for one station of calibration data. Assume that a total of 100 groups of correspondence relations are obtained, it is possible to, for each group of correspondence relation, multiply two edge values therein, summate the obtained 100 multiplication results, and divide the sum by 100 to thereby obtain a similarity of the station of calibration data under a given calibration parameter, namely, obtain a similarity between the image in the station of calibration data and the point cloud data under the given calibration parameter.

2) Search for Calibration

If the calibration verification result is that re-calibration needs to be performed, a procedure of searching for calibration needs to be performed, namely, build an image pyramid for each station of images, perform a search for each layer of pyramid in a top-to-bottom order according to preset initial calibration parameters and point cloud data, and determine an optimal calibration parameter according to search results.

The number of layers of the image pyramids may depend on actual needs. The same number of layers of image pyramids are built for images in each station of calibration data in a thick-to-thin manner (i.e. coarse-to-fine manner).

Figure 3:
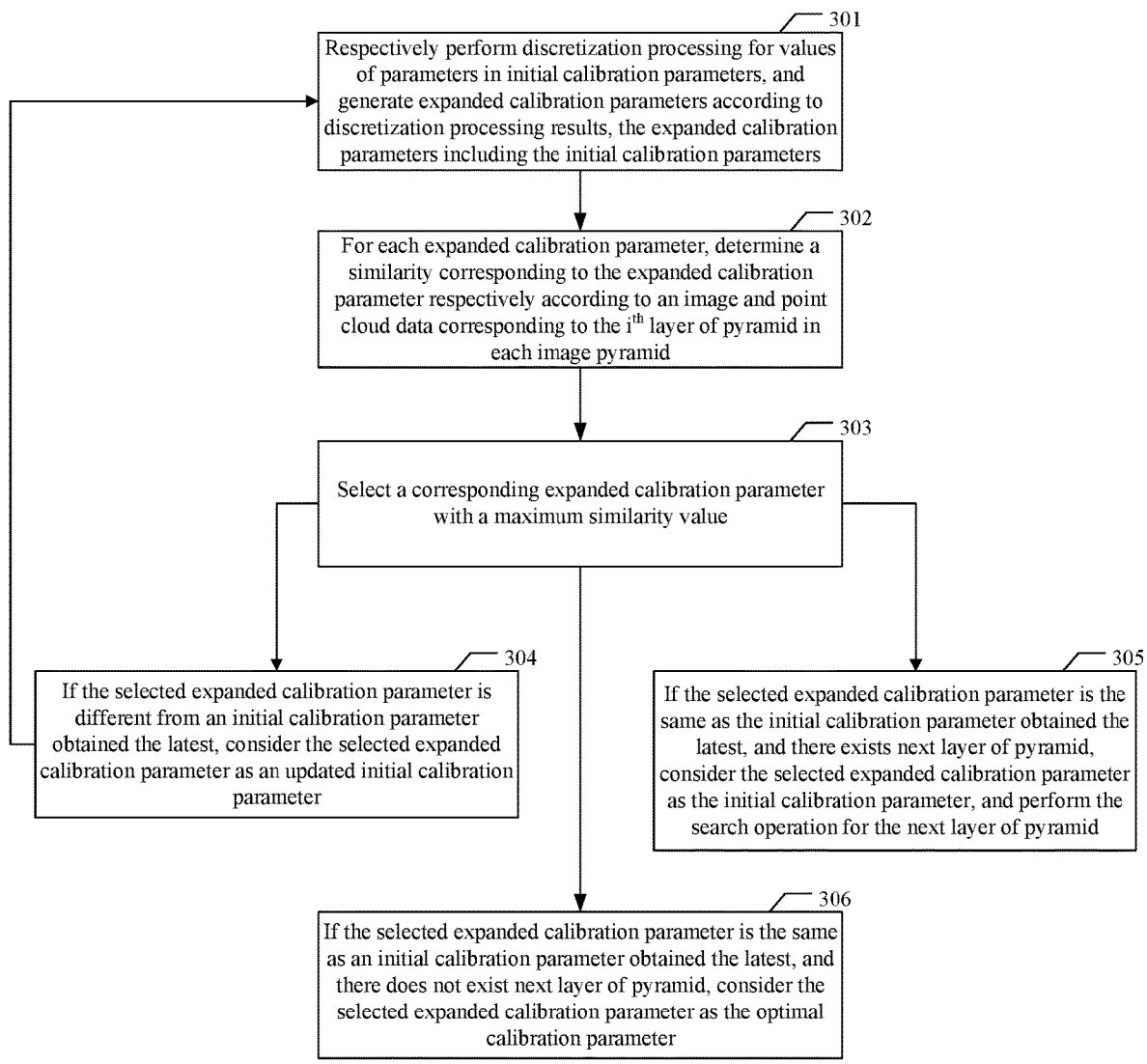
FIG. 3 is a flow chart of an embodiment of a method of searching for the $i^{th}$ layer of pyramid according to the present disclosure.

Then, search may be performed for each layer of pyramid. FIG. 3 is a flow chart of an embodiment of a method of searching for the $i^{th}$ layer of pyramid according to the present disclosure, wherein i is a positive integer, and $1 \leq i \leq M$, and M is a positive integer larger than one and represents the number of layers of image pyramid. As shown in FIG. 3, the embodiment comprises the following specific implementation mode.

In 301, it is feasible to respectively perform discretization processing for values of parameters in initial calibration parameters, and generate expanded calibration parameters according to discretization processing results, the expanded calibration parameters including the initial calibration parameters.

The initial calibration parameters may be artificially set and comprise Q parameters.

It is possible to, for each parameter in the initial calibration parameters, consider a value of the parameter as a default value, and perform discretization processing for the parameter in a predetermined interval to obtain P discrete values, P being an even number, values of the predetermined interval and P depending on actual needs, for example, it is feasible to take 4 discrete values around the parameter. As such, a total of five values are obtained for the parameter, including one default value and 4 discrete values.

Then, the expanded calibration parameters may be generated, each expanded calibration parameter including Q parameters, a value of each parameter is a default value or a discrete value, and any two expanded calibration parameters are not completely the same.

In 302, for each expanded calibration parameter, a similarity corresponding to the expanded calibration parameter is determined respectively according to the image and point cloud data corresponding to the $i^{th}$ layer of pyramid in each image pyramid.

Specifically, it is feasible to, for the $i^{th}$ layer of pyramid in the image pyramid built for the $j^{th}$ station of image, j being a positive integer, and $1 \leq j \leq N$, respectively calculate a similarity between the image corresponding to the $i^{th}$ layer of pyramid and the $j^{th}$ station of point cloud data, then solve a mean value from the calculated N similarities, and consider the calculated mean value as the similarity corresponding to the expanded calibration parameter.

Assume the value of N is 2 and the value of i is 1, it is feasible to, with respect to any expanded calibration parameter, calculate a similarity between the image corresponding to the first layer of pyramid in the image pyramid built for the first station of image and the first station of point cloud data, and calculate a similarity between the image corresponding to the first layer of pyramid in the image pyramid built for the second station of image and the second station of point cloud data, thereby obtaining two similarity calculation results and considering a mean value of the two similarity calculation results as the similarity corresponding to the expanded calibration parameter.

A manner of calculating the similarity between the image and the point cloud data will be detailed any more here and reference may be made to the foregoing related depictions.

303 relates to selecting a corresponding expanded calibration parameter with a maximum similarity value.

304 relates to, if the selected expanded calibration parameter is different from an initial calibration parameter obtained the latest, considering the selected expanded calibration parameter as the updated initial calibration parameter, and repeatedly performing 301 according to the updated initial calibration parameter.

305 relates to, if the selected expanded calibration parameter is the same as an initial calibration parameter obtained the latest, and there exists next layer of pyramid, considering the selected expanded calibration parameter as the initial calibration parameter, and performing searching operation for next layer of pyramid.

306 relates to, if the selected expanded calibration parameter is the same as an initial calibration parameter obtained the latest, and there does not exist next layer of pyramid, considering the selected expanded calibration parameter as an optimal calibration parameter.

That is to say, regarding search for each layer, multiple groups of expanded calibration parameters are generated according to a given initial calibration parameter, search is performed to obtain a group of expanded calibration parameters with a maximum similarity as an initial calibration parameter for search next time, until when the expanded calibration parameter selected upon search of a certain time is the same as the initial calibration parameter obtained the latest, the search with respect to the layer of pyramid ends; search is performed with respect to next layer of pyramid according to the initial calibration parameter obtained latest, until search is performed with respect to the bottom layer of pyramid, the optimal calibration parameter is output, and calibration is finished.

It can be seen that the solutions of the above method embodiments, without depending on a target, may enable real-time online calibration without maintaining a fixed site, and therefore reduce the implementation costs.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

The above introduces the method embodiments. The solution of the present disclosure will be further described through an apparatus embodiment.

Figure 4:
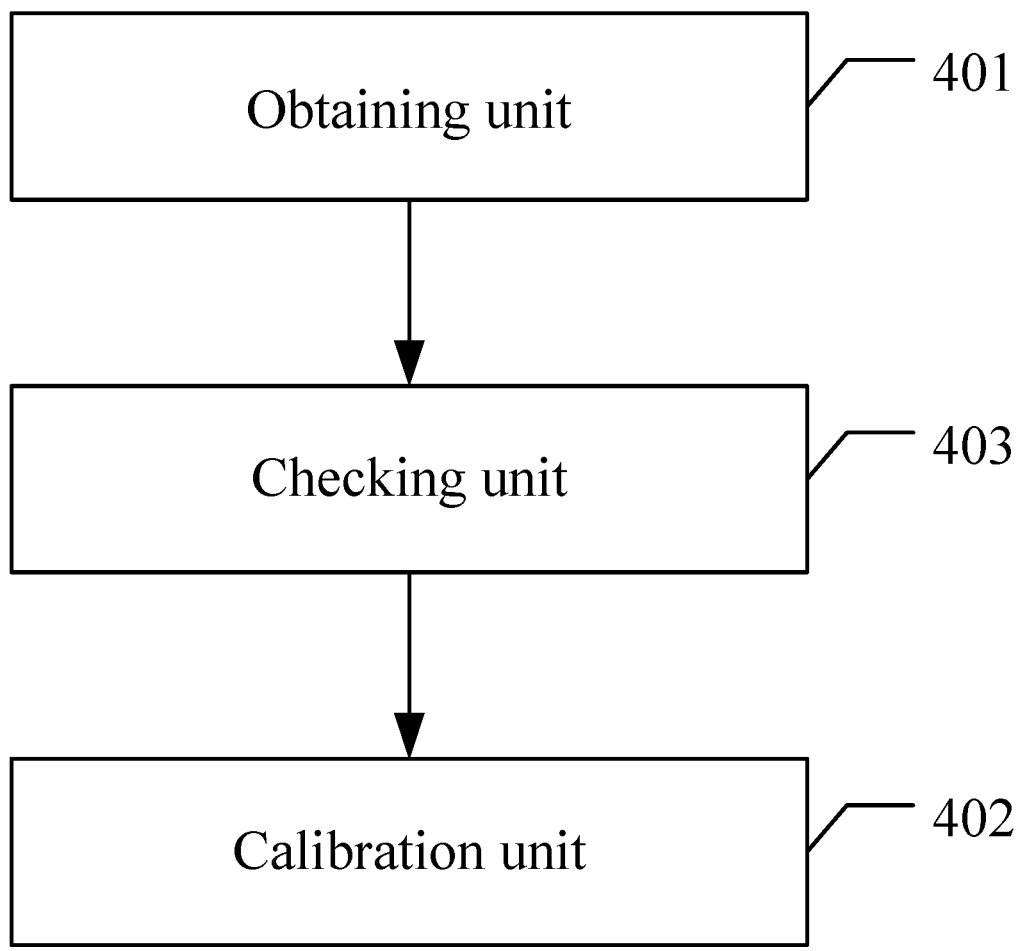
FIG. 4 is a structural schematic view of components of an embodiment of an apparatus for calibration between a laser radar and a camera according to the present disclosure.

FIG. 4 is a structural schematic view of components of an embodiment of an apparatus for calibration between a laser radar and a camera according to the present disclosure. As shown in FIG. 4, the apparatus comprises an obtaining unit 401 and a calibration unit 402.

The obtaining unit 401 is configured to respectively obtain N stations of calibration data at N locations, each station of calibration data respectively comprising: image data collected by a camera and point cloud data collected by a laser radar, N being a positive integer.

The calibration unit 402 is configured to build an image pyramid for each station of images, perform a search for each layer of pyramid in a top-to-bottom order according to a preset initial calibration parameter and point cloud data, and determine an optimal calibration parameter according to search results.

Before a movable platform such as a driverless vehicle mounted with a laser radar and a camera having an overlapping area begins to operate or when it is necessary to verify whether the calibration parameter is normal, it is feasible to collect one station or more stations of calibration data at different locations, each location corresponds to one station of calibration data, and each station of calibration data comprises: one sheet of image data collected by the camera and one frame of point cloud data collected by the laser radar.

It is feasible to, according to the obtained calibration data, first determine whether to perform re-calibration, namely, perform calibration check. Correspondingly, the apparatus shown in FIG. 4 may further comprise a checking unit 403.

The checking unit 403 is configured to determine whether to perform re-calibration according to calibration data, and if yes, send the calibration data to the calibration unit 402 and inform the calibration unit 402 of performing its own function.

Specifically, the checking unit 403 respectively performs discretization processing for values of parameters in the currently-used calibration parameters, and generates expanded calibration parameters according to discretization processing results, the expanded calibration parameters including the currently-used calibration parameters. The calibration parameters comprise Q parameters, Q being a positive integer larger than one.

For example, the checking unit 403 may, for each parameter, consider a value of the parameter as a default value, and perform discretization processing for the parameter in a predetermined interval to obtain P discrete values, P being an even number, and then generate the expanded calibration parameters, each expanded calibration parameter including Q parameters, a value of each parameter being a default value or a discrete value, and any two expanded calibration parameters being not completely the same.

The checking unit 403, may with respect to each expanded calibration parameter, respectively calculate a similarity between an image and point cloud data in each station of calibration data, solve a mean value from the calculated N similarities, and then consider the obtained mean value as a similarity corresponding to the expanded calibration parameter.

if a proportion of expanded calibration parameters meeting a predetermined requirement among all expanded calibration parameters is smaller than a predetermined threshold, the checking unit 403 may determine that re-calibration needs to be performed, the predetermined requirement being that the corresponding similarity is smaller than the similarity corresponding to the currently-used calibration parameter.

Wherein the checking unit 403 may calculate the similarity between the image and point cloud data in each station of calibration data in the following manner: obtaining an edge value of each pixel point in the image; obtaining an edge value of each point in the point cloud data; as for each point in the point cloud data, converting a coordinate of the point into an image coordinate respectively according to an internal parameter of the camera and the calibration parameters, and establishing a correspondence relation between the edge value of the pixel point at the image coordinate and the edge value of the point if the image coordinate is located in a range of coordinate of the image; multiplying two edge values which are in each correspondence relation, summating multiplication results, calculating a ratio of a sum obtained from the summation to the number of established correspondence relations, and considering a calculation result as a desired similarity.

To obtain the edge value of each pixel point in the image, the checking unit 403 may perform edge extraction for the image and obtain an edge image, then consider the edge image as a to-be-processed image, and perform edge blurring processing for the to-be-processed image, which comprises: performing Gaussian blurring for the to-be-processed image; superposing the blurred image and the to-be-processed image according to a predetermined weight to obtain a blurred edge-preserved image; considering the blurred edge-preserved image as the to-be-processed image, repeatedly executing the edge blurring processing until times of repetition reach predetermined times; when the times of repetition reach the predetermined times, considering the blurred edge-preserved image obtained latest as an edge blurred image, and considering a value of each pixel point in the edge blurred image as an edge value of each pixel point.

To obtain the edge value of each point in the point cloud data, the checking unit 403 may perform the following processing for each point in the point cloud data: considering the point as a to-be-processed point; obtaining four neighborhood points of the to-be-processed point; if the four neighborhood points are incomplete, setting the edge value of the to-be-processed point as 1; if the four neighborhood points are complete, respectively calculating a distance difference between each neighborhood point in the four neighborhood points and the to-be-processed point, and selecting the distance difference with a maximum value; if the selected distance difference is larger than 1, setting the edge value of the to-be-processed point as 1; if the selected distance difference is smaller than 0, setting the edge value of the to-be-processed point as 0, otherwise consider the selected distance difference as the edge value of the to-be-processed point; or if the four neighborhood points are complete, respectively calculating a gray level difference between each neighborhood point in the four neighborhood points and the to-be-processed point, selecting a gray level difference with a maximum absolute value, calculating a product of an absolute value of the selected gray level difference and 0.1, setting the edge value of the to-beprocessed point as 1 if the product is larger than 1, and otherwise considering the product as the edge value of the to-be-processed point.

If the checking unit 403 determines that re-calibration needs to be performed, the calibration unit 402 may build an image pyramid for each station of images, perform a search for each layer of pyramid in a top-to-bottom order according to preset initial calibration parameters and point cloud data, and determine an optimal calibration parameter according to search results.

Specifically, the calibration unit 402 may perform a search operation in the following manner with respect to the $i^{th}$ layer of pyramid, wherein i is a positive integer, and $1 \leq i \leq M$, and M is a positive integer larger than one and represents the number of layers of image pyramid.

First, the calibration unit 402 may respectively perform discretization processing for values of parameters in initial calibration parameters, and generate expanded calibration parameters according to discretization processing results, the expanded calibration parameters including the initial calibration parameters.

For example, the calibration unit 402 may, for each parameter, consider a value of the parameter as a default value, and perform discretization processing for the parameter in a predetermined interval to obtain P discrete values, P being an even number, and then generate the expanded calibration parameters, each expanded calibration parameter including Q parameters, a value of each parameter being a default value or a discrete value, and any two expanded calibration parameters being not completely the same.

Then, the calibration unit 402 may, for each expanded calibration parameter, determine a similarity corresponding to the expanded calibration parameter respectively according to the image and point cloud data corresponding to the $i^{th}$ layer of pyramid in each image pyramid.

For example, it is feasible to, for the $i^{th}$ layer of pyramid in the image pyramid built for the $j^{th}$ station of image, j being a positive integer, and $1 \leq j \leq N$, respectively calculate a similarity between the image corresponding to the $i^{th}$ layer of pyramid and the $j^{th}$ station of point cloud data, then solve a mean value from the calculated N similarities, and consider the calculated mean value as the similarity corresponding to the expanded calibration parameter.

After respectively obtaining the similarity corresponding to each expanded calibration parameter, the calibration unit 402 may select a corresponding expanded calibration parameter with a maximum similarity value.

If the selected expanded calibration parameter is different from an initial calibration parameter obtained the latest, the calibration unit 402 may consider the selected expanded calibration parameter as an updated initial calibration parameter, and repeatedly perform the search operation according to the updated initial calibration parameter.

If the selected expanded calibration parameter is the same as an initial calibration parameter obtained the latest, and there exists next layer of pyramid, the calibration unit 402 may consider the selected expanded calibration parameter as the initial calibration parameter, and perform the search operation for the next layer of pyramid.

If the selected expanded calibration parameter is the same as an initial calibration parameter obtained the latest, and there does not exist next layer of pyramid, the calibration unit 402 may consider the selected expanded calibration parameter as an optimal calibration parameter and complete the calibration.

Reference may be made to corresponding depictions in the aforesaid method embodiment for a specific workflow of the apparatus embodiment shown in FIG. 4. The workflow is not detailed any more.

It can be seen that the solution of the above apparatus embodiment, without depending on a target, may enable real-time online calibration without maintaining a fixed site, and therefore reduce the implementation costs.

Figure 5:
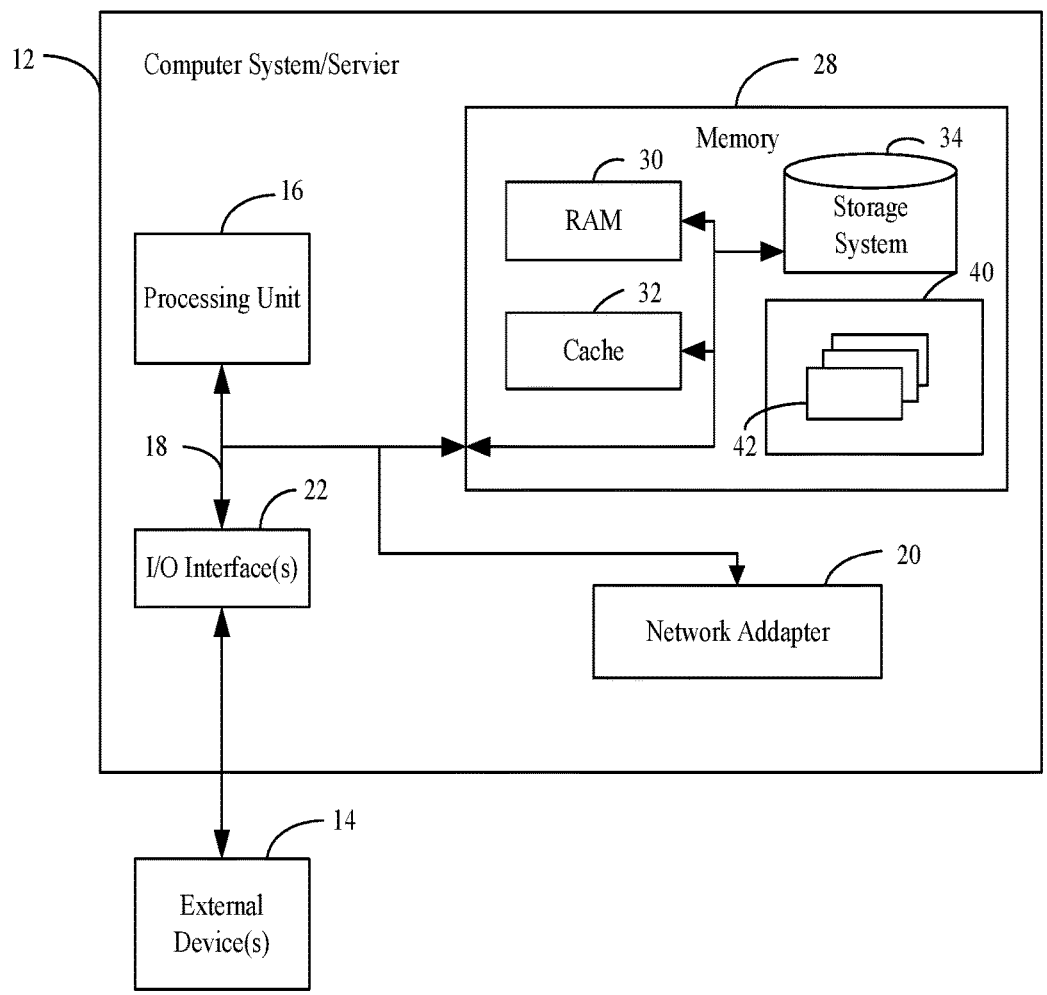
FIG. 5 illustrates a block diagram of an example computer system/server 12 adapted to implement an implementation mode of the present disclosure.

FIG. 5 illustrates a block diagram of an example computer system/server 12 adapted to implement an implementation mode of the present disclosure. The computer system/server 12 shown in FIG. 5 is only an example and should not bring about any limitation to the function and scope of use of the embodiments of the present disclosure.

As shown in FIG. 5, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 5, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 1, namely, respectively obtaining N stations of calibration data at N locations, each station of calibration data respectively comprising: image data collected by a camera and point cloud data collected by a laser radar, N being a positive integer; building an image pyramid for each station of images; performing a search for each layer of pyramid in a top-to-bottom order according to a preset initial calibration parameter and point cloud data, and determining an optimal calibration parameter according to search results.

Reference may be made to related depictions in the above embodiments for specific implementations, which will not be detailed any more.

The present disclosure meanwhile provides a computer-readable storage medium on which a computer program is stored, the program, when executed by the processor, implementing the method stated in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for calibration between a laser radar and a camera, wherein the method comprises:
respectively obtaining N stations of calibration data at N locations, each station of calibration data respectively comprising: an image collected by the camera and point cloud data collected by the laser radar, N being a positive integer;

building a pyramid for the image of each station of calibration data, the pyramid for the image comprising a plurality of layers of the image with increasing resolutions from top-to-bottom; and for each station of calibration data, performing a search for each layer of the pyramid for the image in a top-to-bottom order according to an initial calibration parameter group for calibration between the laser radar and the camera, and the point cloud data, to determine an optimal calibration parameter group for calibration between the laser radar and the camera according to search results.

2. The method according to claim 1, wherein the initial calibration parameter group comprises Q parameters, Q being a positive integer larger than one;

the performing a search for each layer of the pyramid in a top-to-bottom order according to the initial calibration parameter group and the point cloud data, and determining an optimal calibration parameter group according to search results comprises:

performing a search operation in the following manner with respect to the $i^{th}$ layer of the pyramid, wherein i is a positive integer, and $1 \le i \le M$, and M is a positive integer larger than one and represents the number of layers of the pyramid, and the $1^{th}$ layer is topmost layer while the $M^{th}$ layer is the bottom-most layer:

a) respectively performing discretization processing for values of the Q parameters in the initial calibration parameter group, and generating a plurality of different expanded calibration parameter sets according to discretization processing results, the expanded calibration parameter sets including the initial calibration parameter group;

b) for each expanded calibration parameter group, determining a similarity between the point cloud data and the $i^{th}$ layer of the pyramid for the image; and c) selecting an expanded calibration parameter group with a maximum similarity value;

in the case that the selected expanded calibration parameter group is not the initial calibration parameter group, considering the selected expanded calibration parameter as the initial calibration parameter group, and return to performing the processes a)~c);

in the case that the selected expanded calibration parameter group is the initial calibration parameter group, and i<M, performing the search operation for the $i+1^{th}$ layer of the pyramid with the initial calibration parameter group; and in the case that the selected expanded calibration parameter group is the initial calibration parameter group, and i=M, considering the selected expanded calibration parameter group as the optimal calibration parameter group.

3. The method according to claim 2, wherein for each expanded calibration parameter group, determining the similarity between the point cloud data and the $i^{th}$ layer of the pyramid for the image comprises:

for the $i^{th}$ layer of the pyramid for the image of the $j^{th}$ station of calibration data, j being a positive integer, and $1 \le j \le N$, respectively calculating a similarity between the point cloud data of the $j^{th}$ station of calibration data and the $i^{th}$ layer of the pyramid for the image of the $j^{th}$ station of calibration data;

solving a mean value from the calculated N similarities, and considering the calculated mean value as the similarity corresponding to the expanded calibration parameter group.

4. The method according to claim 3, wherein the pyramid for the image of each station of calibration data is built in response to determining according to the calibration data that re-calibration is to be performed.

5. The method according to claim 4, wherein the determining according to the calibration data that re-calibration is to be performed comprises:

performing discretization processing for values of parameters in a currently-used calibration parameter group, and generating a plurality of different expanded calibration parameter group according to discretization processing results, the expanded calibration parameter group including the currently-used calibration parameter group;

with respect to each expanded calibration parameter group, respectively calculating a similarity between the image and the point cloud data in each station of calibration data, solving a mean value from the calculated N similarities, and then considering the obtained mean value as a similarity corresponding to the expanded calibration parameter;

if a proportion of expanded calibration parameter group meeting a predetermined requirement among all expanded calibration parameter group is smaller than a predetermined threshold, determining that re-calibration is to be performed, the predetermined requirement being that the corresponding similarity is smaller than the similarity corresponding to the currently-used calibration parameter group.

6. The method according to claim 5, wherein the performing discretization processing for values of parameters, and generating a plurality of different expanded calibration parameter groups according to discretization processing results comprises:

for each parameter, considering a value of the parameter as a default value, and performing discretization processing for the parameter in a predetermined interval to obtain P discrete values, P being an even number;

generating the plurality of different expanded calibration parameter groups, each expanded calibration parameter groups including Q parameters, a value of each parameter being a default value or a discrete value, and any two expanded calibration parameter groups being not completely the same.

7. The method according to claim 5, wherein the manner of calculating the similarity between the image and point cloud data comprises:

obtaining an edge value of each pixel point in the image;

obtaining an edge value of each point in the point cloud data;

as for each point in the point cloud data, converting a coordinate of the point into an image coordinate respectively according to an internal parameter of the camera and the initial calibration parameter group, and establishing a correspondence relation between the edge value of the pixel point at the image coordinate and the edge value of the point if the image coordinate is located in a range of coordinate of the image;

multiplying two edge values which are in each correspondence relation, and summating multiplication results;

calculating a ratio of a sum obtained from summation to the number of established correspondence relations, and considering a calculation result as the similarity.

8. The method according to claim 7, wherein
the obtaining an edge value of each pixel point in the image comprises:
performing edge extraction for the image and obtaining an edge image;
considering the edge image as a to-be-processed image, and performing edge blurring processing for the to-be-processed image, comprising:
performing Gaussian blurring for the to-be-processed image, and superposing the blurred image and the to-be-processed image to obtain a blurred edge-preserved image;
considering the blurred edge-preserved image as the to-be-processed image, and repeatedly executing the edge blurring processing until times of repetition reach predetermined times;
when the times of repetition reach the predetermined times, considering the blurred edge-preserved image obtained latest as an edge blurred image, and considering a value of each pixel point in the edge blurred image as an edge value of each pixel point.

9. The method according to claim 7, wherein
the obtaining an edge value of each point in the point cloud data comprises:
respectively performing the following processing for each point in the point cloud data:
considering the point as a to-be-processed point;
looking for four neighborhood points of the to-be-processed point;
in the case that neighborhood points less than four are obtained, setting the edge value of the to-be-processed point as 1;
in the case that four neighborhood points are obtained, respectively calculating a distance difference between each neighborhood point in the four neighborhood points and the to-be-processed point, and selecting a distance difference with a maximum value; if the selected distance difference is larger than 1, setting the edge value of the to-be-processed point as 1; if the selected distance difference is smaller than 0, setting the edge value of the to-be-processed point as 0, otherwise considering the selected distance difference as the edge value of the to-be-processed point.

10. The method according to claim 7, wherein
the obtaining an edge value of each point in the point cloud data comprises:
respectively performing the following processing for each point in the point cloud data:
considering the point as a to-be-processed point;
looking for four neighborhood points of the to-be-processed point;
in the case that neighborhood points less than four are obtained, setting the edge value of the to-be-processed point as 1;
in the case that the four neighborhood points are complete, respectively calculating a gray level difference between each neighborhood point in the four neighborhood points and the to-be-processed point, selecting a gray level difference with a maximum absolute value, calculating a product of an absolute value of the selected gray level difference and 0.1, setting the edge value of the to-be-processed point as 1 if the product is larger than 1, and otherwise considering the product as the edge value of the to-be-processed point.

11. A computer device, comprising a memory, a processor and a computer program which is stored on the memory and runs on the processor, wherein the processor, upon executing the program, implements the following operation:
respectively obtaining N stations of calibration data at N locations, each station of calibration data respectively comprising: an image collected by a camera and point cloud data collected by a laser radar, N being a positive integer;
building a pyramid for the image of each station of calibration data, the pyramid for the image comprising a plurality of layers of the image with increasing resolution from top-to-bottom; and
for each station of calibration data, performing a search for each layer of the pyramid for the image in a top-to-bottom order according to an initial calibration parameter group for calibration between the laser radar and the camera, and the point cloud data, to determine an optimal calibration parameter group for calibration between the laser radar and the camera according to search results.

12. The computer device according to claim 11, wherein
the initial calibration parameter group comprises Q parameters, Q being a positive integer larger than one;
the performing a search for each layer of the pyramid in a top-to-bottom order according to an initial calibration parameter group and the point cloud data, and determining an optimal calibration parameter group according to search results comprises:
performing a search operation in the following manner with respect to the $i^{th}$ layer of the pyramid, wherein i is a positive integer, and $1 \leq i \leq M$, and M is a positive integer larger than one and represents the number of layers of the pyramid, and the $1^{th}$ layer is topmost layer while the $M^{th}$ layer is the bottom-most layer:
a) respectively performing discretization processing for values of the Q parameters in the initial calibration parameter group, and generating a plurality of different expanded calibration parameter groups according to discretization processing results, the expanded calibration parameter groups including the initial calibration parameter group;
b) for each expanded calibration parameter group, determining a similarity between the point cloud data and the $i^{th}$ layer of the pyramid for the image; and
c) selecting an expanded calibration parameter group with a maximum similarity value;
in the case that the selected expanded calibration parameter group is not the initial calibration parameter group, considering the selected expanded calibration parameter as the initial calibration parameter group, and return to performing the processes a)~c);
in the case that the selected expanded calibration parameter group is the initial calibration parameter group, and i<M, performing the search operation for the $i+1^{th}$ layer of the pyramid with the initial calibration parameter group; and
in the case that the selected expanded calibration parameter group is the initial calibration parameter group, and i=M, considering the selected expanded calibration parameter group as the optimal calibration parameter group.

13. The computer device according to claim 12, wherein
for each expanded calibration parameter group, determining the similarity between the point cloud data and the $i^{th}$ layer of the pyramid for the image comprises:
for the $i^{th}$ layer of the pyramid for the image of the $j^{th}$ station of calibration data, j being a positive integer, and $1 \leq j \leq N$, respectively calculating a similarity between the point cloud data of the $j^{th}$ station of calibration data and the $i^{th}$ layer of the pyramid for the image of the $j^{th}$ station of calibration data;

solving a mean value from the calculated N similarities, and considering the calculated mean value as the similarity corresponding to the expanded calibration parameter group.

14. The computer device according to claim 13, wherein the pyramid for the image of each station of calibration data is built in response to determining according to the calibration data that re-calibration is to be performed.

15. The computer device according to claim 13, wherein the determining according to the calibration data that re-calibration is to be performed comprises:

performing discretization processing for values of parameters in a currently-used calibration parameter group, and generating a plurality of different expanded calibration parameters according to discretization processing results, the expanded calibration parameters including the currently-used calibration parameter;

with respect to each expanded calibration parameter group, respectively calculating a similarity between the image and the point cloud data in each station of calibration data, solving a mean value from the calculated N similarities, and then considering the obtained mean value as a similarity corresponding to the expanded calibration parameter group;

if a proportion of expanded calibration parameters meeting a predetermined requirement among all expanded calibration parameter groups is smaller than a predetermined threshold, determining that re-calibration is to be performed, the predetermined requirement being that the corresponding similarity is smaller than the similarity corresponding to the currently-used calibration parameter group.

16. The computer device according to claim 15, wherein the performing discretization processing for values of parameters, and generating a plurality of different expanded calibration parameter groups according to discretization processing results comprises:

for each parameter, considering a value of the parameter as a default value, and performing discretization processing for the parameter in a predetermined interval to obtain P discrete values, P being an even number;

generating the plurality of different expanded calibration parameter groups, each expanded calibration parameter group including Q parameters, a value of each parameter being a default value or a discrete value, and any two expanded calibration parameter groups being not completely the same.

17. The computer device according to claim 15, wherein the manner of calculating the similarity between the image and point cloud data comprises:

obtaining an edge value of each pixel point in the image;
obtaining an edge value of each point in the point cloud data;
as for each point in the point cloud data, converting a coordinate of the point into an image coordinate respectively according to an internal parameter of the camera and the initial calibration parameter group, and establishing a correspondence relation between the edge value of the pixel point at the image coordinate and the edge value of the point if the image coordinate is located in a range of coordinate of the image;
multiplying two edge values which are in each correspondence relation, and summating multiplication results;
calculating a ratio of a sum obtained from summation to the number of established correspondence relations, and considering a calculation result as the similarity.

18. The computer device according to claim 17, wherein the obtaining an edge value of each pixel point in the image comprises:

performing edge extraction for the image and obtaining an edge image;
considering the edge image as a to-be-processed image, and performing edge blurring processing for the to-be-processed image, comprising:
performing Gaussian blurring for the to-be-processed image, and superposing the blurred image and the to-be-processed image to obtain a blurred edge-preserved image;
considering the blurred edge-preserved image as the to-be-processed image, and repeatedly executing the edge blurring processing until times of repetition reach predetermined times;
when the times of repetition reach the predetermined times, considering the blurred edge-preserved image obtained latest as an edge blurred image, and considering a value of each pixel point in the edge blurred image as an edge value of each pixel point.

19. The computer device according to claim 17, wherein the obtaining an edge value of each point in the point cloud data comprises:

respectively performing the following processing for each point in the point cloud data:
considering the point as a to-be-processed point;
looking for four neighborhood points of the to-be-processed point;
in case that neighborhood points less than four are obtained, setting the edge value of the to-be-processed point as 1;
in case that four neighborhood points are obtained, respectively calculating a distance difference between each neighborhood point in the four neighborhood points and the to-be-processed point, and selecting a distance difference with a maximum value; if the selected distance difference is larger than 1, setting the edge value of the to-be-processed point as 1; if the selected distance difference is smaller than 0, setting the edge value of the to-be-processed point as 0, otherwise considering the selected distance difference as the edge value of the to-be-processed point.

20. A computer-readable storage medium on which a computer program is stored, wherein the program, when executed by a processor, implements the following operation:

respectively obtaining N stations of calibration data at N locations, each station of calibration data respectively comprising: an image collected by a camera and point cloud data collected by a laser radar, N being a positive integer;
building a pyramid for the image of each station of calibration data, the pyramid for the image comprising a plurality of layers of the image with increasing resolution from top-to-bottom; and
for each station of calibration data, performing a search for each layer of the pyramid for the image in a top-to-bottom order according to an initial calibration parameter group for calibration between the laser radar and the camera, and the point cloud data, to determine an optimal calibration parameter group for calibration between the laser radar and the camera according to search results.

21. The computer-readable storage medium according to claim 20, wherein
the initial calibration parameter group comprises Q parameters, Q being a positive integer larger than one;
the performing a search for each layer of the pyramid in a top-to-bottom order according to an initial calibration parameter group and the point cloud data, and determining an optimal calibration parameter group according to search results comprises:
performing a search operation in the following manner with respect to the $i^{th}$ layer of the pyramid, wherein i is a positive integer, and 1≤i≤M, and M is a positive integer larger than one and represents the number of layers of the pyramid, and the $1^{th}$ layer is topmost layer while the $M^{th}$ layer is the bottom-most layer:
a) respectively performing discretization processing for values of the Q parameters in the initial calibration parameter group, and generating a plurality of different expanded calibration parameter groups according to discretization processing results, the expanded calibration parameter groups including the initial calibration parameter group;
b) for each expanded calibration parameter group, determining a similarity between the point cloud data and the $i^{th}$ layer of the pyramid for the image; and
c) selecting an expanded calibration parameter group with a maximum similarity value;
in the case that the selected expanded calibration parameter group is the initial calibration parameter group, considering the selected expanded calibration parameter group as the initial calibration parameter group, and return to performing the processes a)~c);
in the case that the selected expanded calibration parameter group is the initial calibration parameter group, and i<M, performing the search operation for the $i+1^{th}$ layer of the pyramid with the initial calibration parameter group; and
in the case that the selected expanded calibration parameter group is the initial calibration parameter group, and i=M, considering the selected expanded calibration parameter group as the optimal calibration parameter group.

22. The computer-readable storage medium according to claim 21, wherein
for each expanded calibration parameter group, determining the similarity between the point cloud data and the $i^{th}$ layer of the pyramid for the image comprises:
for the $i^{th}$ layer of the pyramid for the image of the $j^{th}$ station of calibration data, j being a positive integer, and 1≤j≤N, respectively calculating a similarity between the point cloud data of the $j^{th}$ station of calibration data and the $i^{th}$ layer of the pyramid for the image of the $j^{th}$ station of calibration data;
solving a mean value from the calculated N similarities, and considering the calculated mean value as the similarity corresponding to the expanded calibration parameter group.

23. The computer-readable storage medium according to claim 22, wherein the pyramid for the image of each station of calibration data is built in response to determining according to the calibration data that re-calibration is to be performed.

24. The computer-readable storage medium according to claim 22, wherein
the determining according to the calibration data that re-calibration is to be performed comprises:
performing discretization processing for values of parameters in a currently-used calibration parameter group, and generating a plurality of different expanded calibration parameter groups according to discretization processing results, the expanded calibration parameter groups including the currently-used calibration parameter group;
with respect to each expanded calibration parameter group, respectively calculating a similarity between the image and the point cloud data in each station of calibration data, solving a mean value from the calculated N similarities, and then considering the obtained mean value as a similarity corresponding to the expanded calibration parameter group;
if a proportion of expanded calibration parameter groups meeting a predetermined requirement among all expanded calibration parameter groups is smaller than a predetermined threshold, determining that re-calibration is to be performed, the predetermined requirement being that the corresponding similarity is smaller than the similarity corresponding to the currently-used calibration parameter group.

25. The computer-readable storage medium according to claim 24, wherein
the performing discretization processing for values of parameters, and generating a plurality of different expanded calibration parameter groups according to discretization processing results comprises:
for each parameter, considering a value of the parameter as a default value, and performing discretization processing for the parameter in a predetermined interval to obtain P discrete values, P being an even number;
generating the plurality of different expanded calibration parameter groups, each expanded calibration parameter group including Q parameters, a value of each parameter being a default value or a discrete value, and any two expanded calibration parameter groups being not completely the same.

26. The computer-readable storage medium according to claim 24, wherein
the manner of calculating the similarity between the image and point cloud data comprises:
obtaining an edge value of each pixel point in the image;
obtaining an edge value of each point in the point cloud data;
as for each point in the point cloud data, converting a coordinate of the point into an image coordinate respectively according to an internal parameter of the camera and the initial calibration parameter group, and establishing a correspondence relation between the edge value of the pixel point at the image coordinate and the edge value of the point if the image coordinate is located in a range of coordinate of the image;
multiplying two edge values which are in each correspondence relation, and summating multiplication results;
calculating a ratio of a sum obtained from summation to the number of established correspondence relations, and considering a calculation result as the similarity.

27. The computer-readable storage medium according to claim 26, wherein
the obtaining an edge value of each pixel point in the image comprises:
performing edge extraction for the image and obtaining an edge image;
considering the edge image as a to-be-processed image, and performing edge blurring processing for the to-be-processed image, comprising:

performing Gaussian blurring for the to-be-processed image, and superposing the blurred image and the to-be-processed image to obtain a blurred edge-preserved image;

considering the blurred edge-preserved image as the to-be-processed image, and repeatedly executing the edge blurring processing until times of repetition reach predetermined times;

when the times of repetition reach the predetermined times, considering the blurred edge-preserved image obtained latest as an edge blurred image, and considering a value of each pixel point in the edge blurred image as an edge value of each pixel point.

28. The computer-readable storage medium according to claim 26, wherein the obtaining an edge value of each point in the point cloud data comprises:

respectively performing the following processing for each point in the point cloud data:

considering the point as a to-be-processed point;

looking for four neighborhood points of the to-be-processed point;

in the case that neighborhood points less than four are obtained, setting the edge value of the to-be-processed point as 1;

in the case that four neighborhood points are obtained, respectively calculating a distance difference between each neighborhood point in the four neighborhood points and the to-be-processed point, and selecting a distance difference with a maximum value; if the selected distance difference is larger than 1, setting the edge value of the to-be-processed point as 1; if the selected distance difference is smaller than 0, setting the edge value of the to-be-processed point as 0, otherwise considering the selected distance difference as the edge value of the to-be-processed point.

* * * * *